United States Patent [19]

Saitoh et al.

[11] 4,055,623
[45] * Oct. 25, 1977

[54] METHOD OF REMOVING NITROGEN OXIDES FROM A GAS AS A SALT OF IMIDODISULFONIC ACID

[75] Inventors: Shigeru Saitoh; Tetsuya Watanabe; Koji Konno; Tadashi Nakamura, all of Iwaki, Japan

[73] Assignee: Kureha Kagaku Kogyo Kabushiki Kaisha, Tokyo, Japan

[ * ] Notice: The portion of the term of this patent subsequent to Nov. 9, 1993, has been disclaimed.

[21] Appl. No.: 703,200

[22] Filed: July 7, 1976

Related U.S. Application Data

[60] Continuation-in-part of Ser. No. 651,422, Jan. 22, 1976, Ser. No. 542,778, Jan. 21, 1975, Pat. No. 3,992,508, and Ser. No. 542,777, Jan. 21, 1975, Pat. No. 3,991,161, said Ser. No. 651,422, is a division of Ser. No. 517,370, Oct. 23, 1974.

[30] Foreign Application Priority Data

| Jan. 21, 1974 | Japan | 49-9158 |
| May 10, 1974 | Japan | 49-51934 |
| Dec. 4, 1974 | Japan | 49-138967 |
| Dec. 4, 1974 | Japan | 49-138969 |

[51] Int. Cl.$^2$ .................................. C01B 21/00
[52] U.S. Cl. ........................... 423/235; 423/388
[58] Field of Search ............... 423/235, 239, 351, 385, 423/387, 388

[56] References Cited

U.S. PATENT DOCUMENTS

| 3,329,478 | 7/1967 | Garlet et al. | 423/235 |
| 3,984,522 | 10/1976 | Saito et al. | 423/351 |
| 3,991,161 | 11/1976 | Saitoh et al. | 423/235 |
| 3,992,508 | 11/1976 | Saitoh et al. | 423/235 |

FOREIGN PATENT DOCUMENTS

| 521,031 | 3/1931 | Germany | 423/235 |

OTHER PUBLICATIONS

Chem. Abstr., 83:183203z.
Chem. Abstr., 85:129869z.
Chem. Abstr., 85:129870t.
Inorganic Syntheses, vol. V, 1957, pp. 117–124.

*Primary Examiner* — O. R. Vertiz
*Assistant Examiner* — Eugene T. Wheelock
*Attorney, Agent, or Firm* — Lane, Aitken, Dunner & Ziems

[57] ABSTRACT

A method of removing nitrogen oxides from a gas containing nitrogen oxides and converting same to a salt of imidodisulfonic acid, wherein the gas containing nitrogen oxides is brought into contact with an aqueous solution which contains at least one ferrous salt and at least one sulfurous acid alkali salt to absorb the nitrogen oxides in solution in the form of imidodisulfonic acid alkali salts.

9 Claims, No Drawings

METHOD OF REMOVING NITROGEN OXIDES FROM A GAS AS A SALT OF IMIDODISULFONIC ACID

CROSS-REFERENCE TO RELATED APPLICATIONS

The present application is a continuation-in-part of copending applications U.S. Ser. No. 542,777, filed Jan. 21, 1975, now issued as U.S. Pat. 3,991,161 U.S. Ser. No. 542,778, filed Jan. 21, 1975 now issued as U.S. 3,992,508 U.S. Ser. No. 651,422, filed Jan. 22, 1976. The latter application is a divisional application of U.S. Ser. No. 517,370, filed Oct. 23, 1974. The teachings of all of the foregoing applications are hereby incorporated by reference. The present application also claims the priority of Japanese applications 9158/1974, filed Jan. 21, 1974, 51934/1974, filed May 10, 1974, 138967/1974, filed Dec. 4, 1974 and 138969/1974, filed Dec. 4, 1974.

FIELD OF THE INVENTION

This invention relates to a method for removing nitrogen oxides from a gas containing nitrogen oxides, and more particularly to a method of removing nitrogen oxides from the gas and converting the nitrogen oxides to a salt or salts of imidodisulfonic acid.

BACKGROUND OF THE INVENTION

Examples of gases containing oxides of nitrogen (hereinafter referred to an $NO_x$) are exhaust gases from combustion apparatus such as boilers, nitric acid manufacturing plants and various metal treating processes.

In recent years, concern has grown over the so-called photochemical smog. One of the main causes of such photochemical smog is a large quantity of $NO_x$ present in the atmosphere. It is therefore desirable to reduce the quantity of $NO_x$ contained in such exhaust gases and/or to remove $NO_x$ from such exhaust gases.

In a combustion apparatus such as a boiler, for example, the $NO_x$ content in the exhaust gas has been reduced by use of burners and furnaces of improved design. These improved designs, however, are not very effective because they allow the reduction of $NO_x$ only within narrow limits of operation for both theoretical and economical reasons.

It is also well known in the art to employ the so-called wet type processes, for the removal of $NO_x$ from an exhaust gas, using an alkaline aqueous solution containing sodium hydroxide or sodium sulfite; an aqueous solution of potassium permanganate; an aqueous solution of hypochlorite or chlorite; or an aqueous solution of ferrous salt and sulfurous acid alkali salt (alkali sulfite).

SUMMARY OF THE INVENTION

It is therefore an object of the present invention to provide a method of efficiently removing $NO_x$ from a gas containing $NO_x$ in a wet type process, by absorbing the $NO_x$ in solution as a salt of imidodisulfonic acid.

It has now been discovered that $NO_x$ gases are absorbed in a solution containing a ferrous salt and a sulfurous acid alkali salt in the form of imidodisulfonic acid alkali salts. The present inventors have further discovered that the imidodisulfonic acid alkali salt can be reduced to liberate nitrogen or can be converted to a product of commercial value.

DETAILED DESCRIPTION OF THE INVENTION

The aqueous scrubbing solution of the present invention contains at least one ferrous salt and a sulfurous acid alkali salt and may be, for example: (1) an aqueous solution which contains a ferrous salt and a sulfurous acid alkali salt, (2) an aqueous solution which contains a ferrous salt, an organic acid alkali salt and an sulfurous acid alkali salt, (3) an aqueous solution which contains a ferrous salt, an organic acid alkali salt, an organic acid and a sulfurous acid alkali salt, (4) an aqueous solution which contains a ferrous salt of an organic acid and a sulfurous acid alkali salt, or (5) an aqueous solution which contains a ferrous salt of an organic acid, an organic acid alkali salt, an organic acid and a sulfurous acid alkali salt. Examples of suitable ferrous salts include inorganic salts such as ferrous sulfate, ferrous nitrate and ferrous chloride, and various water-soluble ferrous salts of organic acids such as acetic acid, propionic acid, butyric acid, malonic acid, succinic acid, ethylenediamine tetracarboxylic acid and nitrilotricarboxylic acid. When an iron salt of ethylenediamine tetracarboxylic acid or nitrilo-tricarboxylic acid is used, the iron salt need not be in the form of ferrous salt but may also be used in the form of a ferric salt. The ferric salt is easily reduced to the corresponding ferrous salt by the coexisting sulfurous acid alkali salt, forming an aqueous solution which contains substantially a ferrous salt. The organic acid alkali salts used are water-soluble salts of organic acids, for example: salts of organic acids with alkali metals such as Li, Na and K; salts of organic acids with alkali earth metals such as Mg and Ca; and ammonium salts of organic acids. The organic acids forming these organic acid alkali salts include, for example: monobasic acids such as acetic acid, propionic acid and butyric acid; dibasic acids such as malonic acid and succinic acid; polybasic acids such as ethylenediamine tetracarboxylic acid and nitrilo-tricarboxylic acid. A typical example of a ethylenediamine tetracarboxylic acid is ethylenediamine tetraacetic acid (hereinafter referred to as EDTA) and a typical example of a nitrilo-tricarboxylic acid is nitrilo-triacetic acid (hereinafter referred to as NTA). The carboxylic acids forming ethylenediamine tetracarboxylic acids and nitrilo-tricarboxylic acids may be, for example, propionic acid, butyric acid or both of these acids. It should be understood, however, that the carboxylic acids are not limited only to these acids and that other suitable acids may also be employed. The sulfurous acid alkali salts are used in the form of $M_2SO_3$ or $MHSO_3$ (wherein, M represents an alkali as in the organic acid alkali salt) and include, for example, sodium sulfite, potassium sulfite, ammonium sulfite, sodium bisulfite, potassium bisulfite, ammonium bisulfite and the like.

When an $NO_x$-containing gas is contacted with an aqueous solution which contains at least one ferrous salt and a sulfurous acid alkali salt, as previously mentioned, the $NO_x$ and the ferrous salt form a complex in the aqueous solution and the complex thus produced forms an imidodisulfonic acid alkali salt by reaction with the sulfurous acid alkali salt, according to the following reaction formulae (1) and (2) (wherein the ferrous salt is represented by ferrous sulfate, $NO_x$ is represented by NO, and the sulfurous acid alkali salt is represented by sodium sulfite, respectively).

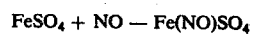

$$FeSO_4 + NO \rightarrow Fe(NO)SO_4 \qquad (1)$$

$$Fe(NO)SO_4 + 2Na_2SO_3 + 2H_2O \rightarrow Fe(OH)_3 + Na_2SO_4 + NH(SO_3Na)_2 \qquad (2)$$

It will be clear from the foregoing reaction formulae (1) and (2) that the absorption of $NO_x$ becomes difficult with an insufficient amount of ferrous salt and that it becomes difficult to satisfactorily produce the imidodisulfonic acid alkali salt with an insufficient amount of sulfurous acid alkali salt. Therefore, the aqueous solution should contain the ferrous salt and sulfurous acid alkali salt in adequate amounts. In the present invention, the aqueous solution should contain the ferrous salt in an amount, in terms of moles, equal to or greater than the amount of $NO_x$ to be absorbed, preferably in an amount at least 0.02% by weight. Moreover, the aqueous solution to be employed in the present invention should contain the sulfurous acid alkali salt in an amount, in terms of moles, two times greater than that of the ferrous salt, preferably in an amount at least 0.2% by weight. With larger amounts of sulfurous acid alkali salt in the aqueous solution larger amounts of imidodisulfonic acid alkali salt are produced. When the content of the sulfurous acid alkali salt in the aqueous solution is equal to or greater than 1% by weight, approximately 90% of the $NO_x$ which has been absorbed in the solution is converted into imidodisulfonic acid alkali salt.

It usually takes a relatively long period of time for the $NO_x$ in the gas to produce imidodisulfonic acid alkali salt after absorption in the aqueous solution. For example, where the $NO_x$ is absorbed in the aqueous solution at 55° C and the solution is then left standing at that temperature, it usually takes 3 to 4 hours before a major portion of the absorbed $NO_x$ is converted into imidodisulfonic acid alkali salt. The reaction time is reduced at higher temperatures. For example, at 90° C, 90% of the absorbed $NO_x$ is converted into imidodisulfonic acid alkali salt in 30 minutes. Thus, it is desirable to heat the absorption solution for the purpose of shortening the reaction time.

The imidodisulfonic acid alkali salt thus formed in the absorption solution has low solubility when it is in the form of a potassium salt or calcium salt, allowing easy separation from the absorption solution. Therefore, when potassium sulfite is present in the scrubbing solution, the potassium salt of imidodisulfonic acid forms in the absorption solution. If desired the potassium salt may easily be precipitated from solution simply by concentrating or cooling the absorption solution. The precipitated potassium (or other insoluble salt) of imidodisulfonic acid may then be separated from the scrubbing solution by any conventional method.

If the imidodisulfonic acid alkali salt formed in the scrubbing solution is not a calcium, potassium or other salt easily precipitated (a salt of low solubility in the scrubbing solution), the soluble imidodisulfonic alkali salt can be converted to a salt of a suitably low solubility simply by adding an appropriate compound to the solution. Suitable compounds which can be added to the solution to produce an insoluble alkali salt of imidodisulfonic acid include ammonium hydroxide, ammonium salts, and various hydroxides and salts of the alkali metals and alkaline earth metals.

When a soluble imidodisulfonic acid alkali salt is converted to the ammonium salt by the addition of ammonia, it is preferable to cool the solution after addition of ammonia. In a preferred embodiment the soluble imidodisulfonic acid alkali salt is precipitated in the form of a potassium salt, by adding a potassium compound such as potassium sulfate, potassium chloride, potassium nitrate or the like to the absorption solution.

It is preferable to employ potassium sulfate as the potassium compound because potassium sulfate has a relatively low solubility as compared with other potassium compounds and allows for easy recovery and cyclic reuse.

Calcium salts suitable for addition to the scrubbing solution includes calcium hydroxide, calcium carbonate, calcium oxide, calcium chloride, calcium nitrate and calcium salts of organic acids such as calcium acetate, calcium propionate and calcium butyrate. A water soluble calcium salt such as calcium chloride or calcium nitrate may be added to the absorption solution in combination with an alkali hydroxide such as sodium hydroxide, potassium hydroxide or ammonium hydroxide. Calcium hydroxide is the preferred calcium compound because calcium hydroxide has a more suitable solubility as compared with other calcium compounds and allows easy conversion of the imidodisulfonic acid alkali salt to the corresponding calcium salt. The imidodisulfonic acid calcium salt may be separated from the solution, by cooling or concentrating the solution.

The use of potassium sulfate or calcium hydroxide avoids an accumulation of anions which occurs in the absorption solution when other potassium or calcium compounds such as potassium chloride, potassium nitrate or calcium chloride are used. The filtrate obtained after separating the imidodisulfonic acid alkali salt from the absorption solution in the form of potassium salt or calcium salt may be used again as the scrubbing solution for the absorption of $NO_x$. If the filtrate is recycled no problems arise even if a portion of the imidodisulfonic acid alkali salt remains in the filtrate. When the imidodisulfonic acid alkali salt is formed in the absorption solution, precipitation of a ferric salt ($Fe(OH)_3$) takes place in the absorption solution as shown by reaction formula (2) above. It is therefore necessary to remove the ferric salt by filtration from the absorption solution. Where the filtrate obtained after separating the imidodisulfonic acid alkali salt in the form of potassium salt or calcium salt is reused as a scrubbing solution for the absorption of $NO_x$, it is necessary to supplement the ferrous salt in the filtrate in an amount suitable for compensating the loss. However, this is not necessary when a polybasic acid such as EDTA or NTA is contained in the aqueous solution to be used for the absorption of $NO_x$, since the ferric salt which has been formed in the absorption solution in the form of a complex with the polybasic acid is easily reduced by the sulfurous acid alkali salt coexisting in the absorption solution; thus there is no need for the removal of the ferric salt or for the supplementation of the ferrous salt. Because a portion of the alkali sulfite in the scrubbing solution is consumed by the production of the imidodisulfonic acid alkali salt, it is necessary to supplement the sulfite ions in the filtrate which is obtained after separation of the imidodisulfonic acid alkali salt from the absorption solution in the form of a potassium or calcium salt, before recirculating the filtrate to the absorption step. However, where the gas under treatment contains sulfur oxides in addition to $NO_x$, the sulfur oxides are also absorbed in the absorption solution simultaneously with the $NO_x$ to produce alkali sulfite in the absorption solution. In such a case, the addition of supplementary alkali sulfite to the filtrate is not always necessary.

In operation of the process, a part of the sulfite ions in the absorption solution is converted into sulfate ions by the oxidation with oxygen contained in the exhaust gas and the formulation of the imidodisulfonic acid alkali salt. Therefore, it is necessary to remove the thus formed sulfate ions from the absorption solution such as by precipitating same simultaneously with the imidodisulfonic acid salt, however, it is preferable to remove the sulfate ions as gypsum by adding calcium carbonate to the absorption solution prior to the separation of the imidodisulfonic acid salt from solution.

The imidodisulfonic acid salts separated from solution as described above are useful for the production of weedicides (herbicides), and can be converted into useful products such as sulfamic acid or ammonium sulfate by hydrolysis. For example, these salts can be hydrolyzed to ammonium sulfate by the method of U.S. application Ser. No. 542,777, filed Jan. 21, 1975.

Alternatively, the imidodisulfonic acid salt formed in the scrubbing solution by the absorption of $NO_x$ can be directly treated without separation from solution. For example, it can be hydrolyzed to ammonium sulfate in the scrubbing solution although it is preferred to separate the salt prior to hydrolysis because it usually exists in the scrubbing solution in a relatively low concentration. Also the scrubbing solution may be treated to reduce the imidodisulfonic acid salt, thereby liberating nitrogen gas, for example by the method of U.S. application Ser. No. 542,778, filed Jan. 21, 1975.

EXAMPLE 1

| | |
|---|---|
| $FeSO_4$ | 2.0 % by weight |
| $Na_2SO_3$ | 3.2 % by weight |
| $CH_3COONa$ | 10.0 % by weight |
| $CH_3COOH$ | 2.4 % by weight |
| $H_2O$ | 82.4 % by weight |

300 ml of NO gas was contacted at room temperature with 100 ml of an aqueous solution having the above composition absorbing therein 290 ml of the NO gas.

The liquid containing the absorbed gas was heated to 95° C and maintained at that temperature for 30 minutes. As a result, a precipitate of an iron compound appeared in the liquid, and a supernatant liquid was obtained by removing the precipitate. In order to separate $NH(SO_3Na)_2$ which was dissolved in the supernatant liquid, 10 g of KCl was added thereto, followed by cooling to room temperature, to obtain 4.5 g of a precipitate.

An infrared absorption spectrum analysis revealed that the precipitate separated from the supernatant liquid contained $NH(SO_3K)_2$. It was found by an analysis that the nitrogen content in the precipitate corresponded to 70% of the absorbed NO gas. A further infrared quantitative analysis revealed that the precipitate contained 47% by weight of $NH(SO_3K)_2$.

Thereafter, the filtrate which was obtained after the filtration of the precipitate from the supernatant liquid was heated and condensed to precipitate a mixture of $N(SO_3K)_3$ and $NH_2(SO_3K)$ which were found, as a result of a quantitative analysis, to have nitrogen contents corresponding to about 20% of absorbed NO. As a result, it was confirmed that about 90% of absorbed NO gas was recovered and fixed.

EXAMPLE 2

| | |
|---|---|
| $FeSO_4$ | 2.0 % by weight |
| $KHSO_3$ | 3.0 % by weight |
| $CH_3COOK$ | 5.0 % by weight |
| $CH_3COOH$ | 1.0 % by weight |

EXAMPLE 2-continued

| | |
|---|---|
| $H_2O$ | 89 % by weight |

300 ml of NO gas was contacted at 55° C with 100 ml of an aqueous solution having the above composition absorbing therein 280 ml of the NO gas. The liquid containing the absorbed gas was left standing at that temperature for 180 minutes. As a result, a precipitate of an iron compound appeared in the liquid. 10 g of KCl was added to the separated supernatant liquid, followed by cooling, to obtain a second precipitate.

As a result of an infrared absorption spectrum analysis, it was revealed that the precipitate separated from the supernatant liquid contained $NH(SO_3K)_2$. The precipitate had a nitrogen content corresponding to about 70% of the absorbed NO gas.

EXAMPLE 3

| | |
|---|---|
| $FeSO_4$ | 2.0 % by weight |
| $Na_2SO_3$ | 5.0 % by weight |
| $CH_3COONa$ | 5.0 % by weight |
| $CH_3COOH$ | 3.0 % by weight |
| $H_2O$ | 85.0 % by weight |

300 ml of NO gas was contacted at 60° C with 100 ml of an aqueous solution having the above composition absorbing therein 290 ml of the NO gas. The liquid containing the absorbed gas was left standing at 60° C for 180 minutes. As a result, a precipitate of an iron compound appeared in the liquid. The iron compound was separated and 25 g of KCl was added to the supernatant liquid, followed by cooling, to obtain a second precipitate.

As a result of an infrared absorption spectrum analysis, it was revealed that the precipitate from the supernatant liquid contained $NH(SO_3K)_2$ which had a nitrogen content corresponding to about 90% of the absorbed NO gas.

EXAMPLE 4

| | |
|---|---|
| $FeSO_4$ | 2.0 % by weight |
| $Na_2SO_3$ | 2.0 % by weight |
| $CH_3COONa$ | 10.0 % by weight |
| $CH_3COOH$ | 2.4 % by weight |
| EDTA-Na | 2.0 % by weight |
| (ethylenediamine sodium tetraacetate) | |
| $H_2O$ | 81.6 % by weight |

300 ml of NO gas was contacted at room temperature with 100 ml of an aqueous solution having the above composition, absorbing therein 280 ml of the NO gas. The liquid containing the absorbed gas was heated to 80° C for 1 hour and thereafter 8 g of $K_2SO_4$ was dissolved in the liquid, followed by cooling to room temperature, to obtain 3 g of a precipitate. An infrared spectrum absorption analysis and an elementary analysis revealed that the precipitate consisted of $NH(SO_3K)_2$ and $K_2SO_4$. According to a quantitative analysis by the infrared spectrum absorption method, the $NH(SO_3K)_2$ component in the precipitate contained apparoximately 50% of the nitrogen of the absorbed NO gas. After removal of the precipitate, the remaining liquid was mixed with 300 ml of NO gas in the same manner as previously described to absorb 270 ml of the NO gas. The gas liquid containing the absorbed gas was heated to 80° C and then mixed with 4 g of $K_2SO_4$, followed by cooling, to obtain a precipitate of approximately 2.6 g of $NH(SO_3K)_2$. The precipitate corresponded in nitrogen content to approximately 89% of the NO gas which was absorbed during the second contact absorption.

EXAMPLE 5

| | |
|---|---|
| FeSO₄ | 4 % by weight |
| Na₂SO₃ | 4 % by weight |
| NTA-Na | 4 % by weight |
| (nitrilo sodium triacetate) | |
| H₂O | 88 % by weight |

300 ml of NO gas was contacted at 50° C with 100 ml of an aqueous solution having the above composition absorbing therein 275 ml of the NO gas. The liquid containing the absorbed gas was left standing for 4 hours at 50° C and then 10 g of $CH_3COOK$ was dissolved in the liquid, followed by cooling to 10° C, to obtain 2.8 g of a precipitate. The precipitate, after centrifugal separation, was studied by infrared absorption spectrum analysis and found to contain $NH(SO_3K)_2$. Under a further quantitative analysis also employing the infrared absorption spectrum method, the 2.8 g of the precipitate was determined to contain 1.7 g of $NH(SO_3K)_2$, which corresponded to 58% of the absorbed NO gas. Presumably, the balance of the absorbed NO gas remained, as shown in Example 4, as dissolved $NH(SO_3K)_2$ in the scrubbing liquid. It is thus possible to increase the recovery rate of imidodisulfonic acid alkali salt by repeated use of the scrubbing liquid.

EXAMPLE 6

| | |
|---|---|
| EDTA-Fe chelate compound | 5 % by weight |
| Na₂SO₃ | 4 % by weight |
| H₂O | 91 % by weight |

Acetic acid was added to an aqueous solution having the above composition to adjust the pH value to 5.5. The thus prepared solution was placed in a gas absorption bottle. After heating the solution to 60° C, a nitrogen gas containing 300 ppm of NO was passed through the solution in the bottle at a rate of 100 l/h for 10 hours. The gas which was discharged from the bottle had an average NO content of 20 ppm. The liquid containing the absorbed gas was heated at 80° C for 4 hours, followed by addition of 4 g of $K_2SO_4$. Upon cooling the liquid, 1.4 g of $NH(SO_3K)_2$ precipitated. The precipitated $NH(SO_3K)_2$ corresponded in nitrogen content to 54% of the absorbed NO gas. In view of the fact that it was possible to precipitate more $NH(SO_3K)_2$ by further concentration of the liquid, the balance of the absorbed NO gas was presumably dissolved in the liquid in the form of $NH(SO_3K)_2$.

EXAMPLE 7

| | |
|---|---|
| FeSO₄ | 3.0 % by weight |
| CH₃COONa | 10.0 % by weight |
| CH₃COOH | 4.5 % by weight |
| Na₂SO₃ | 5.0 % by weight |
| H₂O | 77.5 % by weight |

8500 ml of NO gas was absorbed at 50° C in 2000 ml of an aqueous solution having the above composition. The solution was then heated at 80°·C for 1 hour. As a result, a precipitate of iron hydroxide appeared in the solution. The precipitate was filtered out and 180 g of pottassium sulfate was added to the filtrate, followed by cooling to 30° C, to precipitate crystals.

The crystals were in the form of a mixture consisting mainly of $NH(SO_3K)_2$ and $K_2SO_4$ and containing a small amount of sodium acetate and $NH_2SO_3K$. A quantitative analysis by the infrared absorption spectrum method revealed that the crystals contained 44.3 g of $NH(SO_3K)_2$. After filtering out the crystals, part of the filtrate was adjusted to a pH of 2.0 and then heated for 4 hours. Sodium nitrite was added thereto to generate nitrogen gas. As a result of calculation based on the amount of nitrogen gas generated from the filtrate, it was found that 33.4 g of $NH(SO_3K)_2$ still remained in the filtrate as a whole. This brought the total amount of $NH(SO_3K)_2$ to 77.7 g, which corresponded in nitrogen content to 95.7% of the absorbed NO gas.

EXAMPLE 8

| | |
|---|---|
| FeSO₄ | 2.0 % by weight |
| Na₂SO₃ | 3.2 % by weight |
| CH₃COONa | 10.0 % by weight |
| CH₃COOH | 2.4 % by weight |
| H₂O | 82.4 % by weight |

300 ml of NO gas was contacted at room temperature with 100 ml of an aqueous solution having the above composition, absorbing therein 290 ml of the NO gas. The resulting solution was heated at 95° C for 30 minutes to form therein a precipitate of an iron compound. After separating the precipitate from the liquid, $CaCO_3$ and $(CH_3COO)_2Ca$ were added to the resultant filtrate to adjust the pH to 6.2, and to convert the $Na_2SO_4$ and $Na_2SO_3$ into $CaSO_4$ and $CaSO_3$, respectively. This is because precipitates of $CaSO_4$ and $CaSO_3$ first form in the filtrate in converting the imidodisulfonic acid alkali salt into the form of calcium salt. Thereafter, $Ca(OH)_2$ was added little by little to the solution obtained by separating the thus precipitated $CaSO_4$ and $CaSO_3$ from the filtrate to adjust the pH to 8.0, followed by standing whereby 3.3 g of crystals precipitated.

The crystals were analyzed after recrystallization from water. The analysis revealed that the crystals had the chemical composition of $NS_2O_6NaCa \cdot 3H_2O$. Thus, 94% of the absorbed NO gas was recovered as $NS_2O_6NaCa \cdot 3H_2O$.

EXAMPLE 9

320 ml of pure NO gas was contacted at 55° C with 100 grs. of an aqueous solution having the following composition:

| | |
|---|---|
| NH₄OAc | 5.0 % by weight |
| (NH₄)₂SO₄ | 10.0 % by weight |
| (NH₄)₂SO₃ | 5.0 % by weight |
| (NH₄)₂-EDTA-Fe | 5.0 % by weight |
| Water | 75.0 % by weight |
| pH | 5.7 |

The resulting solution containing absorbed NO was maintained at 55° C then $(NH_4)_2SO_3$ was added to elevate the concentration of $(NH_4)_2SO_3$ therein to 5.0% by weight and to adjust the pH value to 5.7.

An additional 320 ml of pure NO gas was then contacted at 55° C with the solution obtained as above to absorb the NO and the gas-containing solution was maintained at that temperature for 4 hours.

The solution containing absorbed NO thus obtained was cooled to a temperature of 10° C and 20 grs. of $NH_3$ was introduced thereto to precipitate light-brown crystals. The precipitate thus formed was separated from the solution filtration, thereby obtaining 6.4 grs. of light-brown crystals. Quantitative analysis revealed that the crystals contained 2.8 grs. of the imidodisulfonic acid as $NH_4N(SO_3NH_4)_2$.

EXAMPLE 10

320 ml of pure NO gas was contacted at 55° C with 100 grs. of an aqueous solution having 5.0% by weight of Mg(OAC)$_2$, 5.0% by weight of MgSO$_3$ and 5.0% by weight of Mg(EDTA-Fe), and having pH 5.7.

The resulting solution containing absorbed NO was maintained at 55° C for 8 hrs, then MgSO$_3$ was added to elevate the concentration of MgSO$_3$ therein to 5.0% by weight and to adjust the pH value to 5.7.

An additional 320 ml of pure NO gas was then contacted at 55° C with the solution obtained as above to absorb the NO and successively the same procedure was repeated to absorb 1280 ml of the NO in all.

The solution containing absorbed NO thus obtained was cooled to a temperature of 0° C to precipitate light-brown crystals. The precipitate thus formed was separated from the solution by filtration thereby obtaining 7.3 grs. of light-brown crytals. Quantative analysis revealed that the crystals contained 2.1 grs of the imidodisulfonic acid as NH(SO$_3$)$_2$Mg.

We claim:

1. A method for removing nitrogen oxides from a gas mixture, in the form of a solid salt of imidodisulfonic acid comprising:
   contacting the gas mixture with an aqueous scrubbing solution containing at least 0.02% by weight of at least one ferrous salt and at least 0.2% by weight of at least an alkali salt of sulfurous acid to absorb the nitrogen oxides, thereby forming an alkali salt of imidodisulfonic acid in solution;
   cooling the solution containing the alkali salt of imidodisulfonic acid to solidify said alkali salt of imidodisulfonic acid; and
   separating the solidified salt of imidodisulfonic acid from solution.

2. The method of claim 1, wherein said alkali is sodium, potassium, calcium or magnesium.

3. The method of claim 1, wherein said alkali is potassium.

4. A method for removing nitrogen oxides from a gas mixture, in the form of a solid salt of imidodisulfonic acid comprising:
   contacting the gas mixture with an aqueous scrubbing solution containing at least 0.02% by weight of at least one ferrous salt and at least 0.2% by weight of at least an alkali salt of sulfurous acid to absorb the nitrogen oxide, thereby forming a first alkali salt of imidodisulfonic acid dissolved in the scrubbing solution;
   adding to the solution a compound selected from the group consisting of ammonium hydroxide, ammonium salts, alkali metal hydroxides, alkali metal salts, alkali earth metalhydroxides and alkali earth metal salts, said compound reacting with said alkali salt of imidodisulfonic acid to form a second salt of imidodisulfonic acid said second salt being a little soluble in said solution; and
   separating said insoluble second salt from solution.

5. The method of claim 4 wherein said compound is a salt or hydroxide of sodium, potassium, calcium or magnesium.

6. The method of claim 4 wherein said compound is a salt of potassium.

7. The method of claim 4 wherein said compound is potassium sulfate.

8. The method of claim 4 wherein said compound is calcium hydroxide, sodium hydroxide or potassium hydroxide.

9. The method of claim 4 wherein said compound is a calcium salt of an organic acid.

* * * * *